July 7, 1931.  N. N. BROWN  1,813,019
FOLDABLE BED
Filed Feb. 4, 1927   2 Sheets-Sheet 1
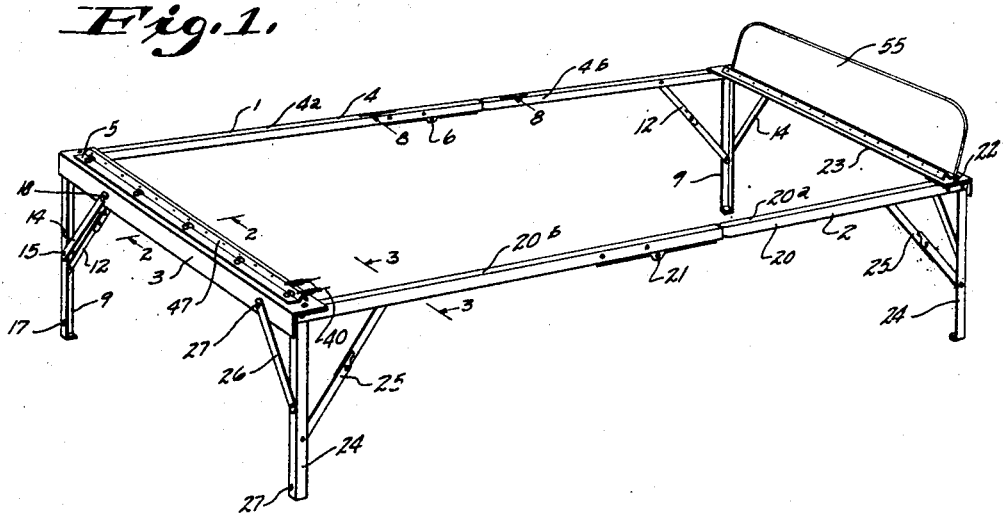
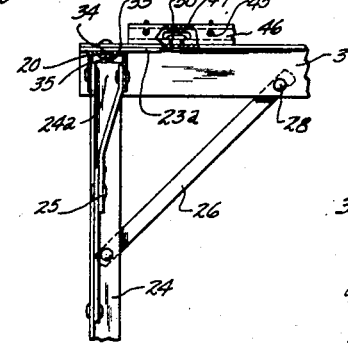
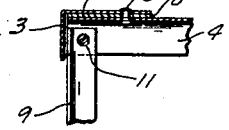
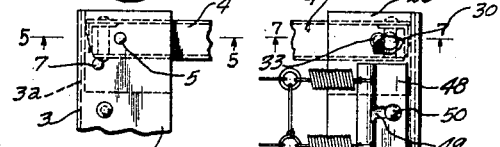
INVENTOR
Newton N. Brown
BY
ATTORNEY

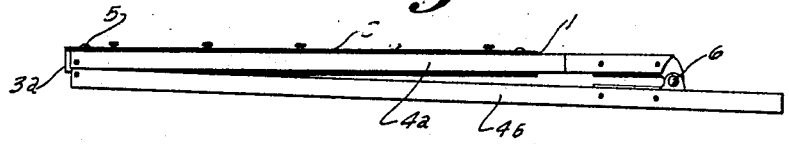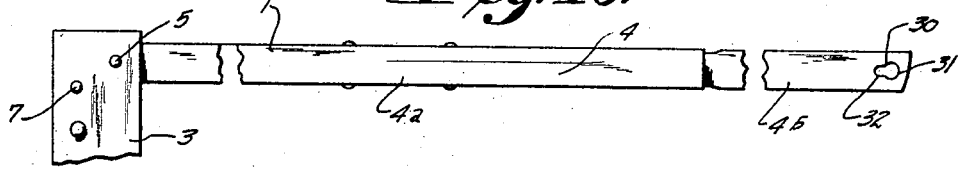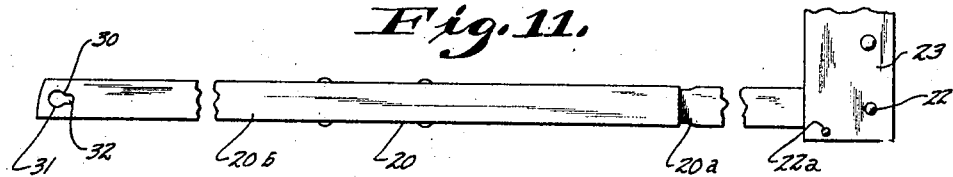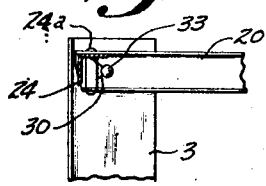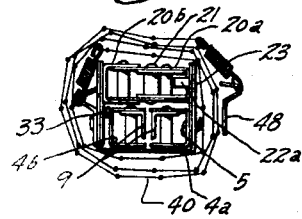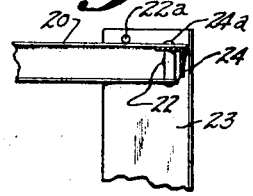

Patented July 7, 1931

1,813,019

UNITED STATES PATENT OFFICE

NEWTON N. BROWN, OF RACINE, WISCONSIN, ASSIGNOR TO GOLD MEDAL CAMP FURNITURE COMPANY, OF RACINE, WISCONSIN, A CORPORATION OF WISCONSIN

FOLDABLE BED

Application filed February 4, 1927. Serial No. 165,779.

This invention relates to improvements in folding beds and more particularly to folding beds of the type especially designed for use by campers, automobile tourists or the like, although also well adapted for universal use.

An object of the invention is to provide a folding bed of this character made up of sections which may be taken apart, the sections being made up of elements that may be folded so that the bed when knocked down may be made into a compact bundle. The bed is easily handled, not only because of the manner in which it is folded into a compact bundle, but also because of the fact that its sections may be taken apart and handled and folded separately. Along with these advantages the bed when set up presents a strong, stable and rigid structure and does not embody in its construction any screws, nuts or similar fastening devices that are tedious to manipulate or that are liable to become so tightly jammed together or stuck as to necessitate the use of a wrench or other tool in knocking down or setting up the bed.

A further object is to provide a folding bed of this character and having these advantages and capacities and which is of simple and durable construction, reliable and effective in operation and easy and comparatively inexpensive to manufacture.

Other objects and advantages reside in certain noval features of the construction, arrangement and combination of parts which will be hereinafter more fully described and particularly pointed out in the appended claims, reference being had to the accompanying drawings forming a part of this specification, and in which:

Figure 1 is a perspective view of a folding bed embodying the present invention, the folding bed being shown set up;

Fig. 2 is a fragmentary view in longitudinal vertical section on line 2—2 of Figure 1, parts being broken away and a foot piece being shown in position for the sake of illustration;

Fig. 3 is a fragmentary view in transverse vertical section on line 3—3 of Figure 1, parts being broken away and shown in section for the sake of illustration;

Fig. 4 is a fragmentary plan view of one corner of the bed frame;

Fig. 5 is a view in longitudinal vertical section on line 5—5 of Figure 4;

Fig. 6 is a fragmentary plan view of another corner of the bed frame, parts being broken away for the sake of illustration;

Fig. 7 is a fragmentary sectional view on line 7—7 of Figure 6;

Fig. 8 is a fragmentary view in longitudinal vertical section on line 8—8 of Figure 1;

Fig. 9 is a view in elevation showing one section of the frame folded up;

Fig. 10 is a fragmentary plan view showing one section of the frame before it is folded;

Fig. 11 is a similar view of the other section of the frame;

Fig. 12 is a view in end elevation showing how the sections of the frame are interfitted and held folded by the spring; and Figs. 13 and 14 are detail views in bottom plan showing corners of the frame.

Referring to the drawings it will be seen that the bed frame comprises two similar sections designated at 1 and 2. The section 1 is made up of an end rail 3 of angular form and a side rail 4 of channel form, the side rail 4 being pivotally connected as at 5 to the end rail 3. The side rail 4 may be made up of parts 4a and 4b having their adjacent ends interfitted and overlapping as shown in Figure 8 and united by a downwardly offset hinge or pivot 6. This construction permits the sections 4a and 4b to be folded back on each other on the pivot 6 as shown in Figure 9 and the pivot 5 permits these sections to be swung into parallelism with the end rail 3 as also shown in Figure 9. Due to the fact that the pivot 5 is offset from the flange 3a of the end rail, the folded sections 4a and 4b are spaced from this flange for a purpose which will be hereinafter more fully described. The side rail 4 is limited in its horizontal swinging movements by means of a stop pin 7 carried by the end rail and projecting downwardly therebelow to engage the adjacent end of the inner side face of the side rail. A combined wear, spacing and reinforcing plate 8 is interposed between the side rail 4 and the end rail 3, the plate 8, which is flat, being fitted flatly against and welded, riveted or otherwise suitably secured to the end rail and serving to provide additional stock on which to anchor the pivot 5 and stop 7, as well as to carry out its reinforcing, spacing and wearing functions.

At each end of the side rail 4 a leg 9 is pivotally mounted, the leg 9 being in the form of an angle iron, terminating in its lower end in a foot 10 and having its upper end pivoted as at 11 to one of the flanges of the channel side rail. A jointed brace 12 is provided between each leg 9 and the side rail 4, the links of the brace 12 being pivoted to leg 9 and the side rail 4 and to each other and having an interlocking lug and notch arrangement 13. Each leg 9 also has a brace 14 pivoted thereto as at 15 and provided with a notch 16 at its free end, the notch 16 being selectively engageable with headed studs 17 and 18 provided on the leg 9 and on the end rails respectively.

The section 2 is similar in construction to the section 1, this section 2 having a side rail 20 made up of parts 20a and 20b with their adjacent ends interfitting and overlapping and connected to a downwardly offset hinge 21. This side rail 20 is pivotally connected as at 22 to an end rail 23 in a manner similar to the end rail 3. As before, the end rail has the portion in which the pivot 22 is mounted reinforced by a plate 23a which also serves as a spacing plate and wear plate. It is to be noted, however, that the pivot 22 is located in close proximity to the normally vertical flange of the end rail. A stop 22a similar to the stop 7 is provided on the end rail 23 to limit the swinging movement of the side rail 20 in one direction, but this stop 22a is located on the outside of the end rail 20 and is spaced a substantial distance from the vertical flange of the end rail as shown. Legs 24 are pivotally mounted as at 24a at the ends of the side rail 20 and have jointed braces 25 similar to the braces 12, and releasable braces 26 similar to the braces 14 and like the braces 14 selectively engageable with headed studs 27 and 28 on the legs and end rails respectively. The legs 9 and 24 when folded up are received in the channels of the side rails and this is also true of the braces associated with the legs which fold snugly against the legs.

For the purpose of interconnecting and interlocking the sections 1 and 2 into a complete and stable bed and yet permitting the bed to be readily set up or knocked down, the sections 4b and 20b of the side rails 4 and 20 respectively are formed with similar keyhole slots designated generally at 30 (see Figures 6 and 11), each keyhole slot having an enlarged portion 31 and a contracted portion 32. Headed studs 33 (see Fig. 7) are provided on the end rails 3 and 23, the studs 33 having shanks 34 depending or extending downwardly from the reinforcing portions of the end rails and carrying the heads 35 at their lower ends. The construction of the studs 33 is such that they are rigidly and securely fixed to the portions of the end rails to which they are attached, as will be understood from Figure 7, and such portions of the end rails are strengthened by reinforcing and wear plates 23a. The heads 35 of the studs 33 may be passed upwardly or downwardly through the enlarged portions 31 of the slots 30 but the contracted portions 32 of the slots are of such size as to receive the shanks 34 only of the studs, the heads 35 of the studs overlapping the margins of the contracted portions when the shanks of the studs extend through the contracted portions 32 as illustrated in Figures 6 and 7.

A spring 40 is provided and is of such construction as to be resilient or elastic to some extent. In the spring shown the body of the spring is made up of interconnected links 41 and at each end of the body of the spring 40 retractile coil springs 42 are provided, the coil springs 42 having hooks 43 interconnected with the links of the body of the spring and also having hooks 44 engageable with eyes or openings 45 provided therefor in an upstanding portion 46 of an attaching member or plate 47 provided at each end of the spring. The upstanding portion 46 is of substantially U-shaped form and is integral with a flat attaching portion 48. The attaching portion 48 and one leg of the upstanding portion 46 are formed with keyhole slots 49 (see Fig. 6) which coact with headed studs 50 fixed to and projecting up from the horizontal flange of each end rail.

With the bed set up as shown in Figure 1, it may be easily knocked down and made up into a compact bundle by disengaging the braces 14 and 26 from the studs 18 and 28, respectively, engaging these braces with the studs 17 and 27, respectively, collapsing the braces 12 and 25 and folding the legs and braces up into the channels of the side rails. The side rails are then broken, that is, the sections thereof are swung toward each other about the pivots 6 and 21 and this relieves the tension of the spring 40 and permits the attaching parts 47 to be readily disengaged from the studs 50, thereby releasing the spring connection between the end rails and permitting these end rails to be moved outwardly along the side rails to bring the heads 35 of the studs 33 into registration with the enlarged portions 31 of the keyhole slots 30 thereby permitting the sections 1 and 2 of the bed to be disengaged from each other. Each section is then folded up as shown in Fig. 9, this folding of the sections 1 and 2 involving the bringing of the sections of the side rail together and the swinging of these sections of the side rails into substantial parallelism with their associated end rails.

Due to the different spacing of the pivots 5 and 22 and to the relation of their respective stops to these pivots, the folded side rail of the section 1 is spaced from the normally vertical flange of its end rail in the folded position of this section, whereas in the folded section 2 the folded side rail lies snug against the vertical flange of its end rail 23. This different spacing permits the folded sections to be interfitted in making up the bundle as illustrated in Figure 12 so that when the spring 40 is wrapped around the interfitted section the end rails tend to hold the side rails folded with the braces and legs retained in the channels thereof and also house these folded parts on three sides. In setting up the sections the spring is unwrapped from the folded sections, the sections are disassociated from each other and unfolded, that is, the side rails are extended and are swung around as far as they may be and to right angular relation with respect to the end rails. The studs 33 are then inserted through the enlarged portions 31 of the slots 30 and the end rails drawn toward each other to cause the heads 35 of these studs 33 to engage the margins of the contracted portions 32 of the keyhole slots 30. The joints of the side rails must be moved upwardly or broken slightly to bring the end rails toward each other and permit assembly of the attaching members 47 of the spring with the headed studs 50 of the end rails. The side rails are then pressed downwardly at their center to bring the sections thereof into alinement whereby the spring 40 is tensioned and due to the downwardly offset pivots 6 and 21 the side rails are automatically locked in extended position. This spring 40 also maintains the studs 33 in the contracted portions 32 of the slots 30 to hold the sections 1 and 2 interlocked. The legs are then pulled out of the channels, the jointed braces extended and the braces 14 and 26 engaged with the studs 18 and 28 respectively.

In conjunction with the bed an end piece 55, which may be used as a head plate as shown in Fig. 1, or as a foot plate as shown in Fig. 2, is provided and consists of a plate of metal or other suitable material which may be suitably reinforced around its edge. Mounting strips 56 are mounted on the end piece 55 and have offset extensions 57 projecting beyond the lower end thereof at an angle and terminating in upturned lips 58. Portions of the extensions 57 of the strips 56 are designed to rest on the headed studs 50 and other portions thereof extend in through the slots 49 so that the lips 58 engage within the inverted U-shaped upstanding portion 46 of the attaching parts 47 to support the end piece in position.

Other forms of end pieces that may be employed are shown in my copending application for folding bed executed under even date.

The invention claimed is:

1. A foldable bed comprising a frame made up of a pair of separable sections, each section including an end rail constituted of an angle iron and a side rail consisting of a pair of hingedly connected parts, a pivotal connection between one end of each side rail and the end rail of its section, the pivotal connection of the side rail and end rail of one section being located adjacent the vertical flange of its end rail, the pivotal connection of the side rail and end rail of the other section being located at a point spaced at a relatively great distance from the vertical flange of its end rail, releasable connections between the free ends of each side rail and the end rail of the other section, said sections when detached and folded up being interfitted to dispose the horizontal flanges of the end rails in substantial parallelism and in protective relation to the folded side rails on three sides thereof.

2. A foldable bed comprising a frame made up of a pair of separable sections, each section including an end rail constituted of an angle iron and a side rail consisting of a pair of hingedly connected parts, a pivotal connection between one end of each side rail and the end rail of its section, the pivotal connection of the side rail and end rail of one section being located adjacent the vertical flange of its end rail, the pivotal connection of the side rail and end rail of the other section being located at a point spaced at a relatively great distance from the vertical flange of its end rail, releasable connections between the free ends of each side rail and the end rail of the other section, said sections when detached and folded up being interfitted to dispose the horizontal flanges of the end rails in substantial parallelism and in protective relation to the folded side rails on three sides thereof, and stops on the end rails adjacent the pivotal connection of the side rails thereto, one stop being located inside of its side rail and between the pivot and the vertical flange of the end rail, the other stop being located on the outside of its side rail and at a point on the opposite side of the associate pivot from the vertical flange of the end rail.

In witness whereof, I hereto affix my signature.

NEWTON N. BROWN.